Figure 1:
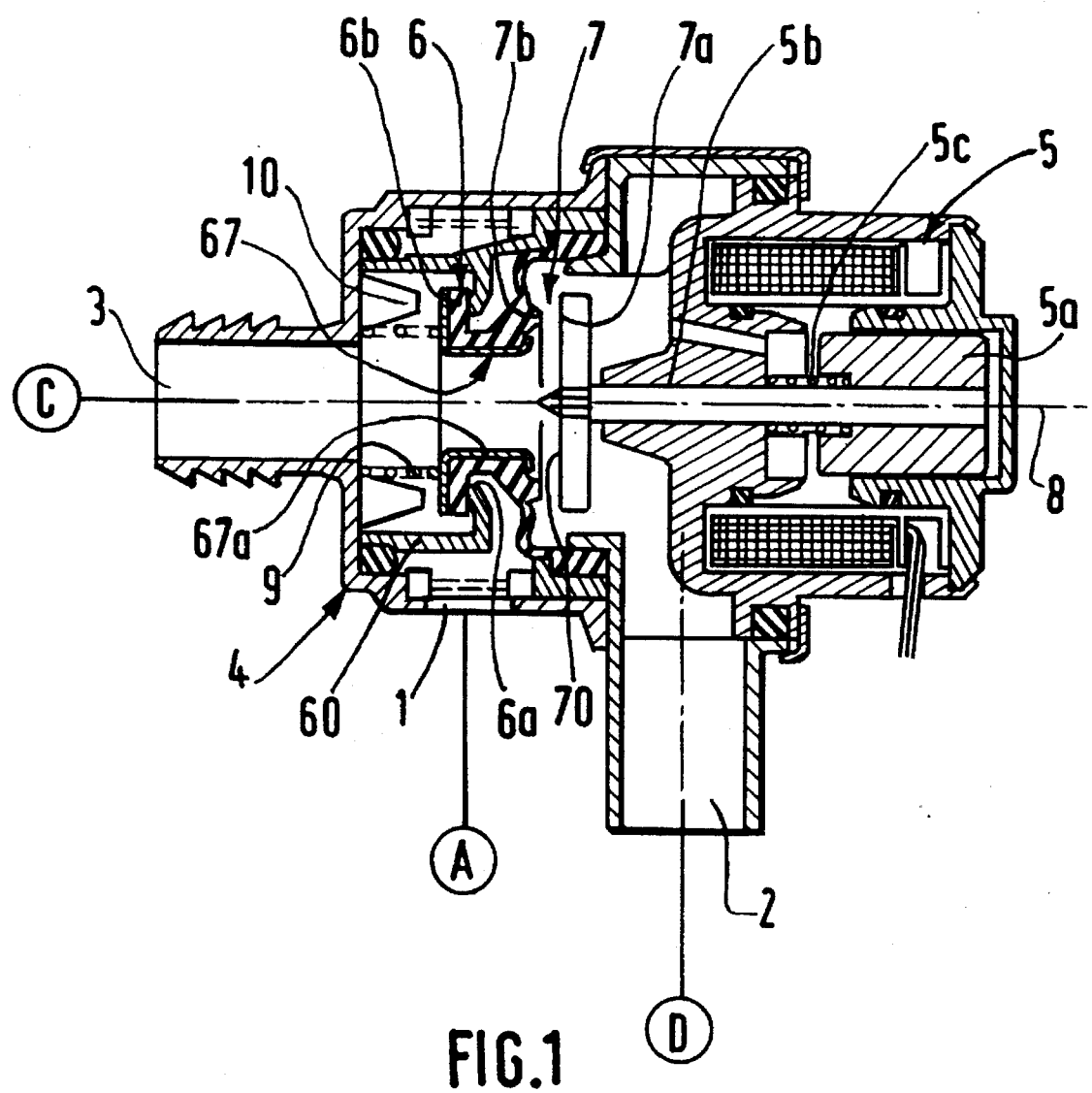

United States Patent [19]
Castel et al.

[11] Patent Number: 5,518,031
[45] Date of Patent: May 21, 1996

[54] PROPORTIONAL PNEUMATIC SOLENOID VALVE

[75] Inventors: Philippe Castel, Paris; Gilbert Kervagoret, Argenteuil, both of France

[73] Assignee: AlliedSignal Europe Services Techniques, Drancy, France

[21] Appl. No.: 295,823

[22] PCT Filed: Jan. 19, 1994

[86] PCT No.: PCT/FR94/00060

§ 371 Date: Jan. 25, 1994

§ 102(e) Date: Jan. 25, 1994

[87] PCT Pub. No.: WO94/18044

PCT Pub. Date: Aug. 18, 1994

[30] Foreign Application Priority Data

Feb. 12, 1993 [FR] France ................... 93 01565

[51] Int. Cl.⁶ ............................................ F16K 11/10
[52] U.S. Cl. ............................................. 137/627.5
[58] Field of Search ............................... 137/627.5

[56] References Cited

U.S. PATENT DOCUMENTS

| | | | |
|---|---|---|---|
| 3,354,894 | 11/1967 | Stoll | 137/627.5 X |
| 3,605,813 | 9/1971 | Nakano | 137/627.5 |
| 4,077,674 | 3/1978 | Doto | 137/627.5 X |
| 4,117,865 | 10/1978 | Beck | 137/627.5 |
| 4,499,921 | 2/1985 | Stoll | 137/627.5 |
| 5,248,191 | 9/1993 | Kondo et al. | 303/117.1 |

FOREIGN PATENT DOCUMENTS 514238 11/1992 European Pat. Off. .
3240276 5/1984 Germany .

*Primary Examiner*—Robert G. Nilson
*Attorney, Agent, or Firm*—Larry J. Palguta; Leo H. McCormick, Jr.

[57] ABSTRACT

This three-way pneumatic solenoid valve comprises: a first inlet (1) connected to a first pressure source (A); a second inlet (2) connected to a second pressure source (D); an outlet (3) connected to a chamber at controlled pressure (C); a hollow body (4) into which t here emerges each of the paths so as to be set in communication therein in a selective fashion with at least one other path; and an electromagnet (5) secured to the body and including a core plunger (5a) capable of actuating means suitable for establishing the selective communication.

The latter essentially comprise a stationary valve (6) and a movable valve (7) housed in the hollow body, the stationary valve being capable of being open when the movable valve is closed and vice-versa, and these valves being defined by a shaft (60), a tubular and movable stopper member (67), and a sealed surface (70) actuated by the electromagnet.

This solenoid valve makes it possible to control the pressure in the chamber (C) as a function of the pressures of the first and second sources, in proportion to a control current signal from the electromagnet.

9 Claims, 2 Drawing Sheets

PROPORTIONAL PNEUMATIC SOLENOID VALVE

The present invention relates to a pneumatic solenoid valve comprising: at least two paths including a first inlet connected to a first pressure source and an outlet connected to a chamber at controlled pressure; a hollow body into which there emerges each of the paths so as to be set in communication therein in a selective fashion, with at least one other path; and an electromagnet secured to the body and including a core plunger capable of actuating means suitable for establishing said selective communication a second inlet connected to a second pressure source, the pressure of the first pressure source being relatively high, and the pressure of the second pressure source relatively low, and the means suitable for establishing said selective communication comprise a stationary valve and a movable valve housed in the hollow body, it being possible for the stationary valve to be open when the movable valve is closed, and vice versa.

Insofar as such solenoid valves are capable of being used in braking systems, which are mass-produced and subject to very strict manufacturing cost constraints, one object of the invention is to propose a solenoid valve making it possible to adjust the pressure in one chamber as a function of an electrical signal, and in which the structure nevertheless remains sufficiently simple for manufacturing to be easy and relatively inexpensive.

To this end, the solenoid valve of the invention is essentially characterized in that the second inlet is located beyond the first inlet with respect to the outlet and in that the means suitable for establishing said selective communication further comprise:

- a shaft formed inside the hollow body along an axis in the extension of the outlet and carrying a first valve element of annular shape pointing towards this outlet, extending in a plane which is substantially perpendicular to the axis, and intended to interact with a second valve element so as to form, together with it, said stationary valve;
- a third valve element formed at the periphery of a sealed surface and capable of being displaced by the core plunger of the electromagnet, along the axis and towards the outlet, so as to interact with a fourth valve element and to constitute with it said movable valve, this third valve element extending in a plane which is distant from the stationary valve and substantially perpendicular to the axis, and;
- a tubular and movable stopper member a first end of which carries said second valve element and a second end of which carries said fourth valve element, the second valve element being urged in the direction of the first valve element at least by a return spring towards a position for closing the stationary valve in which the latter, the shaft, and the stopper member together prevent any communication between the first inlet and the outlet whilst, in the absence of actuation of the electromagnet allowing a communication between the second inlet and the outlet through the movable valve and, with the third valve element urged by actuation of the electromagnet, in the direction of the fourth valve element into a position for closing the movable valve in which the latter and the sealed surface prevent any communication between the second inlet and the outlet whilst allowing, at least for a minimum predetermined actuation force of the electromagnet, a communication between the first inlet and the outlet through the stationary valve, this stopper member in any position preventing any communication between the two inlets.

Preferably, the tubular stopper member defines, together with the first valve element on the one hand, and with the third valve element on the other hand, substantially equal pressure-application surfaces and the outlet as well as the electromagnet are located on said axis, whilst the two inlets emerge onto the periphery of the hollow body, at a distance from the axis.

According to a preferred embodiment, said sealed surface has a central zone which is axially remote from the periphery of this surface in the direction of the outlet, and forming a concavity pointing towards the electromagnet; this sealed surface is then urged towards the electromagnet by an elastic force acting on its periphery, and the core plunger of the electromagnet acts on a first end of a push rod, a second end of which bears on the inside of said concavity without relative alignment constraint.

Moreover, it is advantageous for the distance between the second and the fourth valve element to be variable so as to allow an intermediate state of the solenoid valve in which the stationary and movable valves both remain closed for a non-zero stroke of said core plunger. To this end, the tubular stopper member comprises, for example, first and second tubular parts, which are substantially sealed with respect to each other, sliding with respect to each other and with respect to said hollow body, and respectively carrying the second and fourth valve elements.

In this case, the elastic force applied to the sealed surface may be exerted by a spring, tending to move the second tubular part of the stopper member and this sealed surface away from each other.

Finally, the core plunger may be guided in a stainless steel tube, which offers the advantage of reducing wear and the risks of the core plunger becoming blocked, whilst exhibiting the property of being nonmagnetic.

Figure 2:
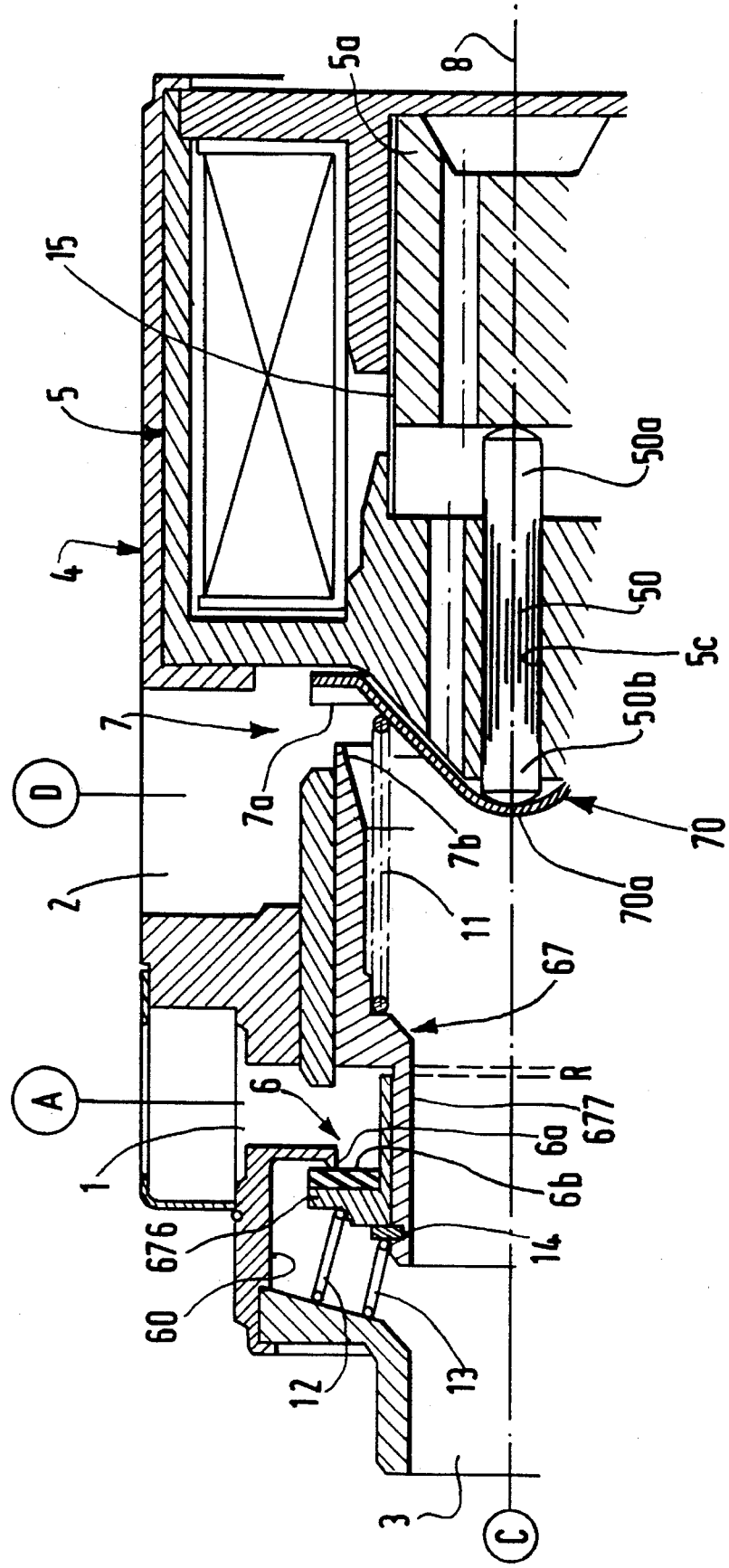

Other features and advantages of the invention will emerge clearly from the description which is given hereafter, by way of an indication and without limitation, with reference to the appended drawings in which:

FIG. 1 is a sectional view of a solenoid valve in accordance with a first embodiment of the invention; and FIG. 2 is a partial sectional view of a solenoid valve in accordance with a second embodiment of the invention.

The pneumatic solenoid valve of the invention includes three paths 1, 2 and 3 and more precisely comprises, as shown in each of these figures: an essentially cylindrical hollow body 4 into which there emerges each of the three paths so as to be set in communication therein in a selective fashion with at least one other path; a first inlet i constituting the first path, connected to a first pressure source, for example consisting of the atmosphere A; a second inlet 2 constituting the second path, connected to a second pressure source whose pressure is lower than that of the first source and which, for example, consists of a vacuum source D; an outlet 3 constituting the third path, located beyond the first inlet 1 with respect to the second inlet 2 and connected to a chamber at controlled pressure C; and an electromagnet 5 secured to the body and including a core plunger 5a capable of actuating means suitable for establishing the selective communication between the three paths.

The means suitable for establishing the selective communication between the three paths 1, 2 and 3 themselves comprise:

- a stationary valve 6 and a movable valve 2 both housed in the hollow body 1, the stationary valve being capable of being open when the movable valve is closed and vice-versa;

a shaft 60 formed inside the hollow body along an axis 8 in the extension of the outlet 3 and carrying a first valve element 6a of annular shape pointing towards this outlet, extending in a plane which is substantially perpendicular to the axis 8, and intended to interact with a second valve element 6b so as to form, together with it, the stationary valve 6;

a third valve element 7a formed at the periphery of a sealed surface 70 and capable of being moved by a rod such as 5b actuated by the core plunger 5a of the electromagnet, along the axis 8 and towards the outlet 3, so as to interact with a fourth valve element 7b and to constitute, together with it, the movable valve 7, this third valve element 7a extending in a plane which is remote from the stationary valve and substantially perpendicular to the axis 8, and;

a tubular and movable stopper member 67, a first end (to the left in the figures) of which carries the second valve element 6b and a second end (to the right in the figures) of which carries the fourth valve element 7b.

The second valve element 6b is urged in the direction of the first valve element 6a, at least by a return spring 9, towards a position for closing the stationary valve in which the latter, the shaft, and the stopper member together prevent any communication between the first inlet 1 and the outlet 3 whilst allowing, in the absence of actuation of the electromagnet 5, a communication between the second inlet 2 and the outlet 3 through the movable valve.

Moreover, the third valve element 7a is urged, by actuation of the electromagnet, in the direction of the fourth valve element 7b into a position for closing the movable valve 7 in which the latter and the sealed surface prevent any communication between the second inlet 2 and the outlet 3 whilst allowing, at least for a predetermined minimum actuation force of the electromagnet, a communication between the first inlet 1 and the outlet 3 through the stationary valve 6, the stopper member 67 preventing, in any position, any communication between the two inlets 1 and 2.

According to an advantageous feature of the invention, the tubular stopper member 67 defines, together with the first valve element 6a on the one hand, and together with the third valve element 7a on the other hand, pressure application surfaces of substantially equal areas.

Moreover, the outlet 3 and the electromagnet 5 are located on the axis 8, whilst the two inlets 1 and 2 emerge onto the periphery of the hollow body 4 at a distance from this axis 8.

According to the first embodiment of the invention (FIG. 1), the stopper member 67 essentially consists of a flexible tube, for example made of rubber, reinforced by a rigid tubular element 67a in the vicinity of its first end (left-hand end), this tube, for example via its other end, being pressed in a sealed fashion against the inside of the hollow body 4 between the first inlet 1 and the second one 2.

The sealed surface in this case assumes the shape of a disk 70, integral with the rod 5b actuated by the core plunger 5a of the electromagnet, and the injection of electric current into this electromagnet therefore brings about the displacement towards the left of the sealed surface 70, counter to the force exerted by a return spring 5c urging the core plunger 5a and the rod 5b which is secured to it, towards a rest position (to the right in FIG. 1).

If, when the movable valve 7 is closed by this movement, the force transmitted to the electromagnet still allows the force of the springs 5c and 9, to which is added the force exerted on the surface of the movable valve 7 by the pressure difference between the second inlet 2 and the outlet 3 to be overcome, the sealed surface 70, which continues to stop up the movable valve 7 is still further pushed towards the left until the stationary valve 6 opens, which brings about the increase in pressure in the chamber C, for at least as long as this pressure does not reach atmospheric pressure, and the corresponding increase, until the surface 70 reaches an equilibrium position, of the force exerted on this surface by the differential pressure counter to the actuation force of the electromagnet.

Axial pins 10 evenly distributed about the axis 8 and allowing a passage of air are located on the inside of the hollow body 4 facing the stopper member 67 so as to limit the crushing of the spring 9 and to limit the stroke of this stopper member.

According to a second embodiment of the invention (FIG. 2), the sealed surface 70 has a central zone 70a which is axially remote from the periphery of this surface in the direction of the outlet 3 and which forms a concavity pointing towards the electromagnet 5.

This sealed surface is urged towards the electromagnet by a spring 11 exerting an elastic force applied on its periphery, and the core plunger of the electromagnet pushes on a first free end 50a of a push rod 50, a second free end 50b of which bears on the inside of the concavity of the surface 70, each of these ends being free to pivot with respect to the component against which it is pushed.

The rod 50, which is thus free of any relative alignment constraint, is guided in an axial bore 5c of the electromagnet, and this arrangement leads to a considerable reduction in friction and risks of blocking.

The second embodiment represented in FIG. 2 further makes it possible to contrive easily that the distance between the second valve element 6b and the force valve element 7b be variable, which allows an intermediate state of the solenoid valve in which the stationary and movable valves both remain closed for a non-zero stroke R of the electromagnet core plunger 5a, and gives the solenoid valve high operational stability.

To this end, for example, the stopper member 67 comprises first and second tubular parts 676 and 677, which are substantially sealed with respect to each other, and slide with respect to each other and with respect to the hollow body 4, and which respectively carry the second and fourth valve elements 6b, 7b.

The second tubular part 677 supports the spring 11 which tends to move it away from the sealed surface 70. Moreover, the parts 676, 677 of the stopper member are both pushed back elastically away from the outlet 3 and towards the electromagnet by respective springs 12 and 13, a stop 14 limiting the relative movement of these tubular parts 676 and 677.

Finally, as shown in FIG. 2, the core plunger is advantageously guided in a thin stainless steel tube 15, making it possible to reduce friction and wear.

According to another embodiment of the valve shown in FIG. 2, the non-zero stroke R is increased in such a way that the second tubular part 677 cannot push the first tubular part 676, the valve then working as a pressure limiting valve.

We claim:

1. A pneumatic solenoid valve comprising: at least two paths including a first inlet connected to a first pressure source and an outlet connected to a chamber at controlled pressure; a hollow body into which emerges each of the paths which communicate selectively with at least one other path; and an electromagnet secured to the body and including a core plunger capable of actuating means suitable for establishing said selective communication; and a second inlet connected to a second pressure source, the pressure of the first pressure source being relatively high, and the pressure of the second pressure source relatively low, and the means suitable for establishing said selective communication comprising a stationary valve and a movable valve housed in the hollow body, the stationary valve being open when the movable valve is closed, and vice-versa, characterized in that the second inlet is located beyond the first inlet with respect to the outlet and in that the means suitable for establishing the selective communication further comprises:

a shaft formed inside the hollow body along an axis in an extension of the outlet and carrying a first valve element of annular shape pointing towards the outlet, extending in a plane which is substantially perpendicular to the axis and intended to interact with a second valve element to form with the second valve element said stationary valve;

a third valve element formed at the periphery of a sealed surface and capable of being displaced by the core plunger of the electromagnet, along the axis and toward the outlet, so as to interact with a fourth valve element and to constitute with the fourth valve element said movable valve, the third valve element extending in a plane which is distant from the stationary valve and substantially perpendicular to the axis, and;

a tubular and movable stopper member a first end of which carries said second valve element and a second end of which carries said fourth valve element, the second valve element being urged in the direction of the first valve element at least by a return spring and toward a position for closing the stationary valve in which the stationary valve, the shaft, and the stopper member together prevent any communication between the first inlet and the outlet while, in the absence of actuation of the electromagnet, allowing a communication between the second inlet and the outlet through the movable valve and, with the third valve element urged by actuation of the electromagnet, in the direction of the fourth valve element, into a position for closing the movable valve in which the movable valve and the sealed surface prevent any communication between the second inlet and the outlet while allowing, at least for a minimum predetermined actuation force of the electromagnet, a communication between the first inlet and the outlet through the stationary valve, the stopper member in any position preventing any communication between the two inlets.

2. The pneumatic solenoid valve according to claim 1, characterized in that the tubular stopper member defines, together with the first valve element and with the third valve element substantially equal pressure-application surfaces.

3. The pneumatic solenoid valve according to claim 2, characterized in that the outlet and said electromagnet are located on said axis, while the two inlets emerge onto the periphery of the hollow body at a distance from the axis.

4. The pneumatic solenoid valve according to claim 1, characterized in that said sealed surface has a central zone which is axially remote from the periphery of the surface in the direction of the outlet, and forming a concavity pointing towards the electromagnet, the sealed surface urged toward the electromagnet by an elastic force acting on a periphery thereof, and the core plunger of the electromagnet acting on a first end of a push rod a second end of which bears on the inside of said concavity without relative alignment constraint.

5. The pneumatic solenoid valve according to claim 1, characterized in that the distance between the second and the fourth valve element is variable so as to allow an intermediate state of the solenoid valve in which the stationary and movable valves both remain closed for a non-zero stroke of said core plunger.

6. The pneumatic solenoid valve according to claim 5, characterized in that said tubular stopper member comprises first and second tubular parts which are substantially sealed with respect to each other, sliding with respect to each other and with respect to said hollow body, and respectively carrying the second and fourth valve elements.

7. The pneumatic solenoid valve according to claim 5 or 6, characterized in that said elastic force is exerted by a spring tending to move the second tubular part of the stopper member and said sealed surface away from each other.

8. The pneumatic solenoid valve according to claim 1, characterized in that the core plunger is guided in a stainless steel tube.

9. The pneumatic solenoid valve according to claim 5 or 6, characterized in that said non-zero stroke is such that the second tubular part cannot move the first tubular part.

* * * * *